US006854839B2

(12) United States Patent
Collier et al.

(10) Patent No.: US 6,854,839 B2
(45) Date of Patent: Feb. 15, 2005

(54) PAY-PER-USE PRINTING

(75) Inventors: Dan L Collier, Ridgefield, WA (US); Jeremy Bunn, Kelso, WA (US); Charles Newby, Camas, WA (US); Andrew Levy, West Linn, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/412,047

(22) Filed: Apr. 11, 2003

(65) Prior Publication Data

US 2004/0201634 A1 Oct. 14, 2004

(51) Int. Cl.[7] ................................................ G01D 11/00
(52) U.S. Cl. ........................... 347/100; 347/19; 347/14; 700/400
(58) Field of Search ............................. 358/296; 347/7, 347/19; 700/34, 400, 30; 399/79, 80

(56) References Cited

U.S. PATENT DOCUMENTS

| | | | | | |
|---|---|---|---|---|---|
| 5,469,196 | A | * | 11/1995 | Okazaki et al. | 347/8 |
| 5,636,032 | A | * | 6/1997 | Springett | 358/296 |
| 5,921,686 | A | | 7/1999 | Baird et al. | 400/68 |
| 6,061,668 | A | | 5/2000 | Sharrow | 705/400 |
| 6,216,113 | B1 | * | 4/2001 | Aikens et al. | 705/34 |
| 6,243,450 | B1 | | 6/2001 | Jansen et al. | 379/144 |
| 6,322,192 | B1 | | 11/2001 | Walker | 347/19 |
| 6,325,505 | B1 | | 12/2001 | Walker | 347/19 |
| 6,335,968 | B1 | | 1/2002 | Malik | 379/114.2 |
| 6,457,883 | B1 | | 10/2002 | Silverbrook et al. | 400/62 |
| 6,477,443 | B2 | | 11/2002 | Salgado et al. | 700/220 |

* cited by examiner

*Primary Examiner*—Stephen D. Meier
*Assistant Examiner*—Ly T Tran

(57) ABSTRACT

In one embodiment, an imaging device includes an ink density information gathering procedure. An ink use calculation procedure receives input from the ink density information gathering procedure, allowing the amount of ink used to be calculated. A job cost procedure calculates a print job value based on the amount of ink used.

20 Claims, 3 Drawing Sheets

PAY-PER-USE PRINTING

TECHNICAL FIELD

This disclosure relates to pay-per-use printing by an imaging device.

BACKGROUND

Pay-per-use printing facilities attempt to permit people to print when and where they need their print jobs. Pay-per-use printing is becoming more common as hotels, offices, kiosks and other locations provide for the printing needs of people away from their typically used printers. Ideally, when paying by the print job, people are able to obtain the services they need for reasonable prices.

However, as with most business transactions, there is some issue as to what rates should be charged for pay-per-use printing. The rate charged may affect consumer's willingness to purchase pay-per-use printing services, since consumers are interested in assurances that they are paying a fair amount and receiving good value.

SUMMARY

In one embodiment, an imaging device includes an ink density information gathering procedure. An ink use calculation procedure receives input from the ink density information gathering procedure, allowing the amount of ink used to be calculated. A job cost procedure calculates a print job value based on the amount of ink used.

BRIEF DESCRIPTION OF THE DRAWINGS

The same reference numbers are used throughout the drawings to reference like features and components.

DETAILED DESCRIPTION

Figure 1:
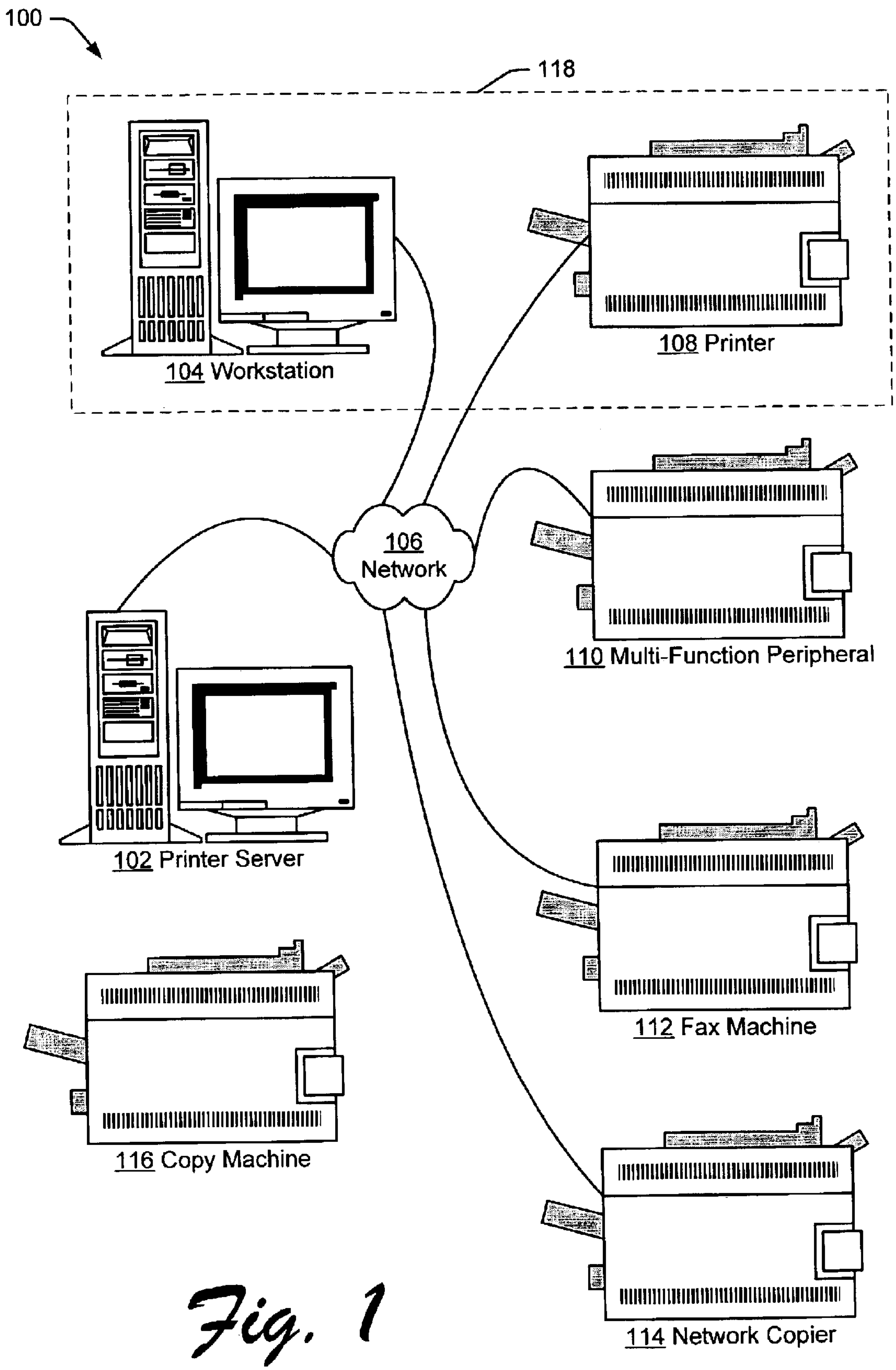
FIG. 1 is an illustration of an exemplary environment within which examples of imaging devices configured for pay-per-use operation are seen.

FIG. 1 is an illustration of a typical environment 100 within which examples of imaging devices configured for pay-per-use operation are seen. A print server or file server 102 is configured to receive a print job, from any of a plurality of workstations 104. The print job may be sent over a network 106 to any type of imaging device 108–114, such as a printer 108, multifunctional peripheral 110, fax machine 112, network copier 114, or other printing or imaging device. The network may be wired or wireless, and the workstations 104 may additionally include handheld devices, personal data assistants (PDAs), cellular telephones or other electronic devices configured to send data files for printing to either wired or wireless printers. Similarly, a stand-alone copy machine 116 may receive a print job by scanning a document. In each case, the imaging device 108–116 is configured to print the print job in a pay-per-use manner wherein the customer is charged only for the print job printed. In an optional embodiment, a workstation 104 and a printer 108 may be configured to form a stand-alone kiosk 118 for use in an airport, hotel, shopping mall or other location. By combining the workstation 104 and printer 108, the customer is given more options to send the print job to the imaging device.

Figure 2:
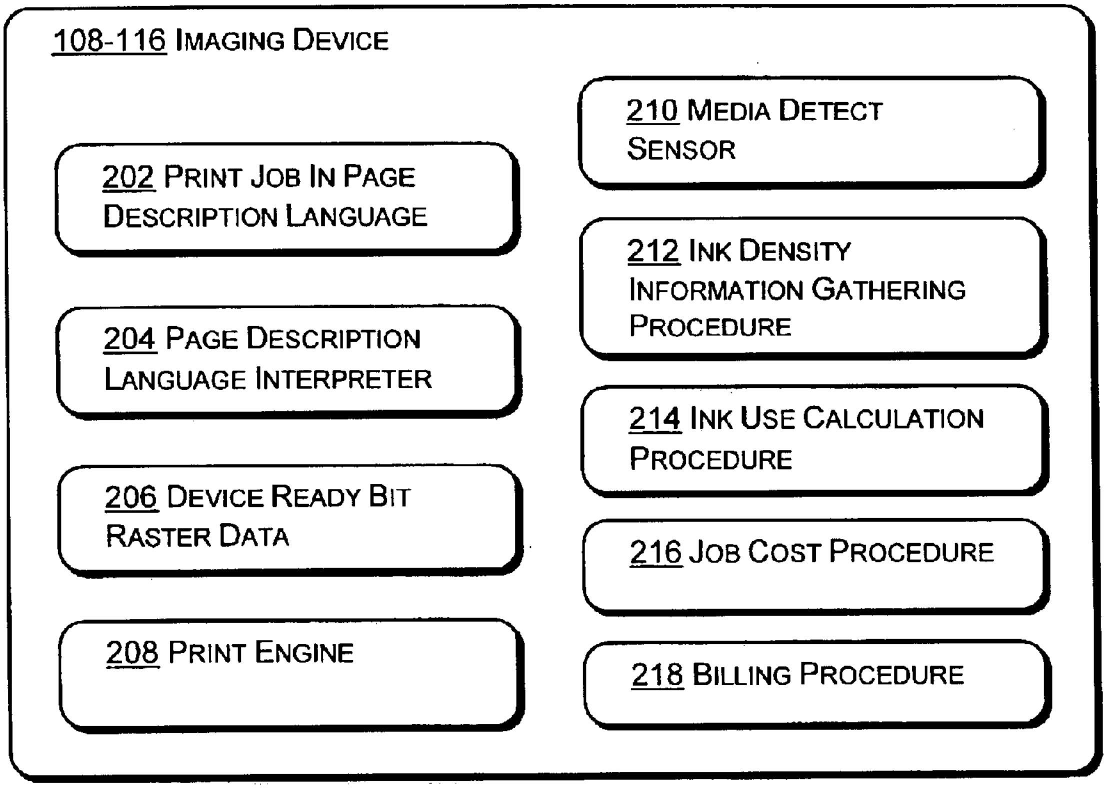
FIG. 2 is a block diagram that illustrates an exemplary implementation of components within an imaging device configured for pay-per-use printing.

FIG. 2 is a block diagram that illustrates an example of an implementation of components within an imaging device 108–116 configured for pay-per-use printing. A print job 202 arrives at the imaging device in page description language or other form. A page description language interpreter 204 or similar translating structure converts the print job 202 into device ready bit raster data 206 suitable for output by the print engine 208.

A media detect sensor 210 is configured to scan print media—such as standard paper, photographic paper, transparencies or other media—either before and/or after printing. Where the media detect sensor 210 is used to scan the media prior to printing, the type of media can be determined. Where the media detect is additionally or alternatively used after printing, the media type as well as the actual distribution of ink on the media may be determined. The actual ink distribution may be compared to the intended distribution of ink. Accordingly, failure or quality degradation of the print engine 208 may be detected, thereby allowing for correction, repair or replacement. Additionally—as will be seen in greater detail—data related to the actual ink distribution may be used to determine pay-per-use costs.

An ink density information gathering procedure 212 may be configured to obtain information about the ink density applied to the print media. In a first embodiment of the ink density information gathering procedure 212, the media detect sensor 210 is used to provide information on the ink applied to each pixel of the print media. For example, a given pixel may have had no ink applied, black ink applied or one or more drops of color and/or black ink applied. The media detect sensor 210 is configured to detect and report such situations, thereby enabling the ink density information gathering procedure 212 to determine how many drops of ink were applied to a given pixel. The number of drops of ink may include black ink, individual ink colors, individual photo ink colors, and compound ink colors formed by a plurality of drops of ink comprising two or more constituent colors.

A second embodiment of the ink density information gathering procedure 212 is configured to scan the device ready bit raster data 206 to obtain information on the quantity and type of ink applied to all pixels, or a representative sampling of pixels, applied to the print media. By analysis of the device ready bit raster data 206, the ink type and quantity used on any subset of pixels, or all pixels, within the print job may be determined. In particular, the number of pixels using black, color and photo-quality inks may be determined. Additionally, the amount of each type of ink used per firing of an ink nozzle can be determined, as well as the number of firings. Accordingly, by scanning the device ready bit raster data 206, the exact use level (or approximate use level, if desired) of all types of ink may be determined. For example, the raster data 206 may indicate a given level of resolution, and that resolution may indicate that each pixel may have a specific size. The size of the pixel may indicate use of a specific quantity of ink. Accordingly, the correct quantity of each type of ink which was applied to each pixel may be determined by analysis of the device ready bit raster data 206.

An ink use calculation procedure 214 may be configured to receive information from the ink density information gathering procedure 212 and to calculate or estimate the ink used for an entire print job or any portion of the print job.

The ink use calculation procedure 214 may make a calculation of the ink used in a print job with higher or lower precision. For example, the calculation may be made to a higher degree of accuracy by totaling the ink used by all or most pixels, as determined by the ink density information gathering procedure 212. Such a calculation may involve totaling ink density information gathered, wherein procedure 212 was configured to examine all or most pixels by using the media detect sensor 210 or by referring to data 206 associated with pixels. The calculation may result in the totaling of each color pixel according to the constituent inks used. For example, where two or more colors of ink were used in a single pixel, the ink use calculation procedure may be configured to total all of the ink colors used in the pixel.

Alternatively, the ink use calculation procedure 214 may make a calculation of the ink used in a print job having a lower degree of accuracy. Such a calculation may be made by performing a less detailed analysis of the information supplied by the ink density information gathering procedure 212 or by an ink density information gathering procedure 212 which is configured to obtain less detailed information. Such a calculation may be made by averaging the ink used by groups of pixels, by taking a representative sampling of pixels and extrapolating their ink use to the entire project, or by other means which estimate ink use.

A job cost procedure 216 is configured to receive the calculation or estimation of ink used in printing a print job made by the ink use calculation procedure 214. Using this calculation or estimation, the job cost procedure 216 makes a determination of the cost or value to be associated with the print job. Additionally, the job cost procedure 216 may receive information from the media detect sensor 210 indicating the type of media used. Where the job cost procedure 216 is configured to receive media type information, the job cost procedure 216 is additionally configured to factor into the job cost calculation the cost of the media used in the course of the print job.

A first exemplary implementation of the job cost procedure 216, configured determine a customer's bill, may include calculations suggested by Table 1, below. Table 1 includes cost values that are for example only, and would typically be adjusted frequently to reflect market conditions.

An upper portion of Table 1, labeled "Basic Billing Costs" illustrates exemplary costs associated with the ink required for marking black and colored pixels and also the costs associated with plain paper and photographic quality paper. A middle portion of Table 1 illustrates "Basic Job Data," i.e. the data associated with an exemplary print job, including both black and colored ink applied to seven sheets of plain paper. The algorithm which determines the cost of the print job seen at the bottom of the table is: basic job cost=(cost per black pixel*number of black pixels this job)+(cost per colored pixel*number of colored pixels this job)+(cost per plain paper sheet*number of pages this job). Application of the algorithm to the basic job data, using the basic job costs, results—for purposes of example only—in a print job cost of $3.70.

TABLE 1

| | |
|---|---|
| Basic Billing Costs | |
| Cost per black pixel | $0.0000200 |
| Cost per colored pixel | $0.0000500 |
| Cost per plain paper sheet | $0.05 |
| Cost per photo paper sheet | $1.00 |
| Basic Job Data | |
| Number of black pixels this job | 50,000 |
| Number of colored pixels this job | 40,000 |
| Paper type | 8.5 × 11 plain |
| Number of pages | 7 |
| Basic Job Cost = (Cost per black pixel * Number of black pixels this job) + (Cost per colored pixel * Number of colored pixels this job) + (Cost per plain paper sheet * Number of pages this job) | Computed total: $3.70 |

A second exemplary implementation of the job cost procedure 216, configured to determine a customer's bill, may include calculations suggested by Table 2, below. Table 2 includes cost values that are for example only, and would typically be adjusted frequently to reflect market conditions.

An upper portion of Table 2, labeled "Advanced Billing Costs" illustrates exemplary costs associated with the ink required for marking black, colored and/or photo pixels and also the costs associated with plain paper, photographic quality paper, and photo-sized 4"×6" paper. Additionally, the costs of cleaning cycles, data transfer, daytime or nighttime cost differentials, data transfer costs, location surcharges and service provider surcharge are indicated.

A middle portion of Table 2 illustrates "Advanced Job Data," i.e. the data associated with an exemplary print job, including both black, colored and/or photo ink (wherein photo ink is a special type of color ink) applied to seven sheets of plain paper. Cleaning cycles required, data transfer and time of day are also considered. The algorithm which determines the cost of the print job seen at the bottom of the table is: advanced job cost=(cost per black pixel*number of black pixels this job)+(cost per color pixel*number of color pixels this job)+(cost per photo pixel*number of photo pixels this job)+(cost per 8.5×11 photo paper sheet*number of pages this job)+(cost per pen cleaning cycle*number of pen cleaning cycles)+cost per night use+(cost per kilobyte data transferred*kilobytes transferred)+difficult location surcharge+service provider surcharge. Application of the algorithm to the basic job data, using the basic job costs, results—for purposes of example only—in a print job cost of $15.71.

TABLE 2

| | |
|---|---|
| Advanced Billing Costs | |
| Cost per black pixel | $0.0000200 |
| Cost per colored pixel | $0.0000500 |
| Cost per photo pixel | $0.0000300 |
| Cost per plain paper sheet | $0.050 |
| Cost per 8.5 × 11 photo paper sheet | $1.000 |
| Cost per 4 × 6 photo paper sheet | $0.450 |
| Cost per pen cleaning cycle | $0.070 |
| Cost per day use | $0.001 |
| Cost per night use | $0.500 |
| Cost per kilobyte data transferred | $0.001 |
| Difficult location surcharge | $0.250 |
| Service provider surcharge | $0.750 |
| Advanced Job Data | |
| Number of black pixels this job | 50,000 |
| Number of color pixels this job | 40,000 |
| Number of color pixels this job | 50,000 |
| Paper type | 8.5 × 11 photo |
| Number of pen cleaning cycles | 3 |
| Time of day | night |
| Kilobytes transferred | 2500 |

TABLE 2-continued

| | |
|---|---|
| Number of pages | 7 |
| Advanced job cost = (Cost per black pixel * Number of black pixels this job) + (Cost per color pixel * Number of color pixels this job) + (Cost per photo pixel * number of photo pixels this job) + (Cost per 8.5 × 11 photo paper sheet * number of pages this job) + (Cost per pen cleaning cycle * Number of pen cleaning cycles) + Cost per night use + (Cost per kilobyte data transferred * Kilobytes transferred) + Difficult location surcharge + Service provider surcharge | Computed total: $15.71 |

A billing procedure 218 is configured to bill the cost of the print job to an account, such as a credit card, charge account or other billing account.

Figure 3:
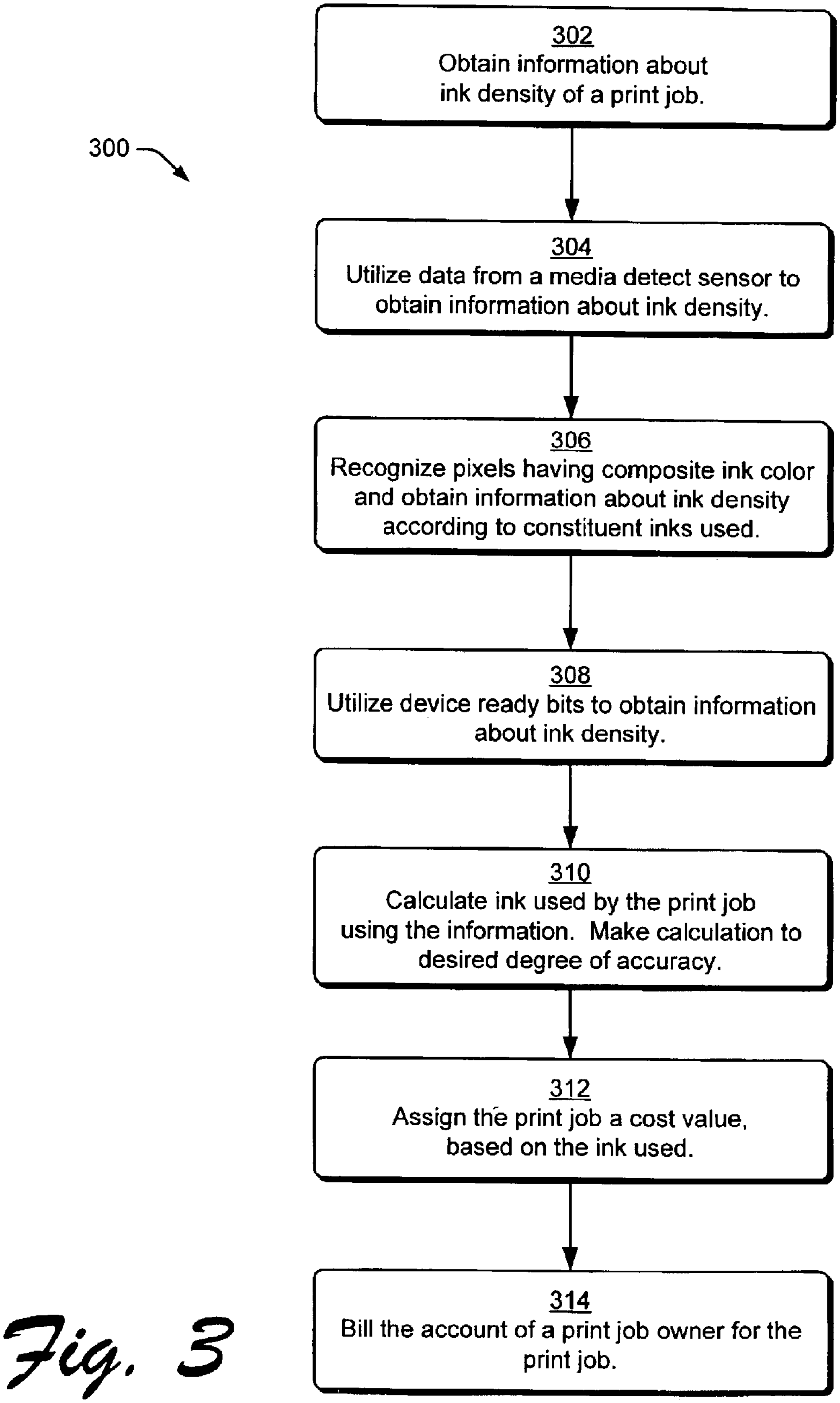
FIG. 3 is a flow diagram that describes the operation of an exemplary implementation of an imaging device configured for pay-per-use printing.

FIG. 3 is a flow diagram that describes the operation of an implementation of an imaging device configured for pay-per-use printing. The elements of the method 300 may be performed by any desired means, such as by the execution of processor-readable instructions defined on a processor-readable media, such as a disk, a ROM or other memory device, or by operation of an application specific integrated circuit (ASIC) or other hardware device. In one embodiment, the ROM may contain firmware implementing one or more of the structures seen in FIG. 2 according to an exemplary method as seen in the flow chart of FIG. 3. In an alternative embodiment, an ASIC may contain logic which implements one or more of the modules seen in FIG. 2. The embodiment seen in FIG. 3 contains actions in blocks that may be performed in parallel with actions described in other blocks, may occur in an alternate order, or may be distributed in a manner which associates actions with more than one other block.

At block 302, information is obtained about the ink density of a print job by calling an ink density information gathering procedure 212 or other software, firmware or hardware structure. At block 304, data from a media detect sensor 210 is utilized to obtain information about ink density. The media detect sensor 210 passes over the print media after it is marked by the print engine 208. As a result, the media detect sensor 210 is able to detect pixels to which black or color ink has been applied and pixels to which no ink has been applied. At block 306, pixels to which a composite color of ink has been applied are recognized, and information is obtained about the constituent ink colors used to form the composite color is determined. For example, where cyan and magenta ink has been applied to a pixel, the composite color is recognized and information regarding the constituent colors—cyan and magenta—is determined.

At block 308, where a media detect sensor 210 is not used to detect ink on each pixel, the device ready bits 206 which provide information to the print engine 208 may be used by the ink density information gathering procedure 212 or other structure to determine the ink density of the print job. For example, data regarding each pixel may be analyzed to determine whether black, cyan, magenta, yellow and/or photographic ink colors or other ink types were applied. Additionally, the size of each pixel may be used to determine the amount of ink applied. For example, where a print job is performed at high resolution using small pixels, the ink used in each pixel may be smaller than another print job performed at lower resolution.

At block 310, the ink used by the print job is calculated by an ink use calculation procedure 214 or similar software, firmware or hardware structure using data discovered regarding ink density of the pixels forming the print job. The calculation may be made to a desired degree of accuracy. For example, the calculation maybe made to a higher degree of accuracy by totaling the ink used on all or most of the pixels. Alternatively, the calculation may be made to a lower degree of accuracy by totaling the ink used to a representative sampling of pixels, or other method not involving basing the calculation on data from every pixel.

At block 312, the print job is assigned a cost value, based on the ink used. This assignment may be made by a job cost procedure 216 or similar software, firmware or hardware structure using data discovered regarding the ink used. At block 314, the cost may then be billed to a customer's account by a billing procedure 218 or similar structure.

Although the disclosure has been described in language specific to structural features and/or methodological steps, it is to be understood that the appended claims are not limited to the specific features or steps described. Rather, the specific features and steps are exemplary forms of implementing this disclosure. For example, while, actions described in blocks of the flow diagrams may be performed in parallel with actions described in other blocks, the actions may be omitted, the actions may occur in an alternate order, or may be distributed in a manner that associates actions with more than one other block. And, while the procedures described are typically configured in firmware, they could alternatively be configured in software or in hardware, such as in an ASIC (application specific integrated circuit) or in a gate array. Additionally, while different functions have been separated for purposes of illustration—e.g. ink density information gathering and ink use calculation—these functions could alternatively be merged into a comprehensive, multifunctional firmware, software or hardware procedure. And, while the use of black, colored and photo-type inks have been disclosed, the use of specialty inks, fixer and laminate could similarly be used, sensed, totaled and the customer billed. Similarly, while reference has been made to "ink", it is clear that toner or other inks could be used in a manner consistent with this disclosure.

What is claimed is:

1. An imaging device configured for pay-per-use printing, comprising:

a media detector sensor that scans print media after printing to detect the media type and the distribution of ink on the print media;

an ink density information gathering means that receives ink density information from the media detector sensor;

an ink use calculation means that receives input from the ink density information gathering means and calculates ink used; and a job cost means that calculates print job value and an amount to charge a user based on the ink used.

2. The imaging device of claim 1, wherein the imaging device is selected from a group comprising:

a printer;

a multifunctional peripheral;

a fax machine;

a network copier; and a stand-alone copy machine.

3. The imaging device of claim 1, wherein the media detect sensor recognizes pixels having a composite color, and wherein the ink density information gathering means processes the pixels having composite color according to a constituent color dot total.

4. The imaging device of claim 1, wherein the job cost means receives media type information from the media detect sensor and uses that information in calculating the print job value.

5. The imaging device of claim 1, additionally comprising:

a billing means to charge an account for the print job value.

6. An imaging device configured for pay-for-use printing, comprising:

means for scanning printed print media to detect the media type and the distribution of ink on the print media;

means for gathering ink density information from the means for scanning;

means for calculating ink use using the ink density information; and means for calculating print job value and an amount to charge a user based on the ink use.

7. The imaging device of claim 6, wherein the means for scanning recognizes pixels having composite color, and wherein the means for gathering ink density information processes the pixels having composite color according to a constituent color dot total.

8. The imaging device of claim 6, wherein the means for calculating print job value receives media type information from the means for scanning and uses that information in calculating the print job value.

9. The imaging device of claim 6, additionally comprising:

means for billing an account for the print job value.

10. A processor-readable medium comprising processor-executable instructions for deriving a cost for use in pay-per-use printing, the processor-executable instructions comprising instructions for:

obtaining information about ink density of a print job provided by a media detect sensor that scans printed print media to detect the media type and the distribution of ink on the print media;

calculating ink used by the print job using the information; and assigning the print job a cost value to be charged to a user based on the ink used.

11. A processor-readable medium as recited in claim 10, wherein the instructions for calculating ink used utilize data associated with a representative sampling of pixels that is fewer than all of the pixels of the print media.

12. A processor-readable medium as recited in claim 11, wherein instructions for operating the media detect sensor recognize pixel having a composite color, and wherein the instructions for obtaining information about the ink density of the print job process the pixels having composite color according to constituent inks used.

13. A processor-readable medium as recited in claim 10, wherein the instructions for assigning the cost value to the print job receive media type information from the media detect sensor and uses that information in calculating the cost value.

14. A processor-readable medium as recited in claim 10, comprise further instructions for:

billing an account for the cost value.

15. A method for calculating print job value for the purpose of charging users for printing, comprising:

scanning printed print media to detect the media type and the ink distribution on the print media;

acquiring ink coverage information resulting from the scanning;

determining ink used using the ink coverage information;

determining a cost to charge a user for a print job based on the ink used.

16. The method as recited in claim 15, wherein the scanning is performed by a media detect sensor.

17. The method as recited in claim 15, wherein the determining additionally comprises:

processing pixels having a composite color according by summing ink used in constituent colors.

18. The method as recited in claim 15, wherein the determining additionally comprises:

processing a representative sampling of pixels fewer than all of the pixels of the print media to estimate the ink used.

19. The method as recited in claim 15, wherein the pricing additionally includes media costs.

20. The method as recited in claim 15, additionally comprising:

billing an account for the print job value.

* * * * *